United States Patent [19]
Okayama et al.

[11] Patent Number: 5,375,013
[45] Date of Patent: Dec. 20, 1994

[54] OPTICAL LOW PASS FILTER

[75] Inventors: Hiroaki Okayama, Hirakata; Shusuke Ono, Takatsuki, both of Japan

[73] Assignee: Matsushita Electric Industrial Co. Ltd., Osaka, Japan

[21] Appl. No.: 54,134

[22] Filed: Apr. 30, 1993

[30] Foreign Application Priority Data

May 6, 1992 [JP] Japan .................................. 4-113438

[51] Int. Cl.$^5$ .............................................. G02B 5/04
[52] U.S. Cl. ...................................... 359/831; 359/832; 359/833; 359/834; 359/835
[58] Field of Search ............... 359/831, 832, 833, 834, 359/835, 836, 837; 358/44, 47

[56] References Cited

U.S. PATENT DOCUMENTS

| | | | |
|---|---|---|---|
| 4,472,735 | 9/1984 | Shinozaki et al. | 359/628 |
| 4,477,148 | 10/1984 | Tsuji et al. | 350/286 |
| 4,795,236 | 1/1989 | Ise . | |
| 5,237,446 | 8/1993 | Takahashi | 359/359 |

FOREIGN PATENT DOCUMENTS

0186166A1  7/1986  European Pat. Off. .
0454409A1  10/1991  European Pat. Off. .

*Primary Examiner*—Eugene R. LaRoche
*Assistant Examiner*—Huan Hoang
*Attorney, Agent, or Firm*—Wenderoth, Lind & Ponack

[57] ABSTRACT

An optical low pass filter including a phase grating for obtaining useful picture image characteristics by provision of preferable low pass effects for each of wave form zones about the spatial frequency components beyond Nyquist limit which are required to be removed as the picture images are discretely sampled in nature in an optical system of a single tube color television camera having a color separating filter, a color video camera using solid state imaging elements, and so on, which is easier in construction to be constructed.

8 Claims, 4 Drawing Sheets

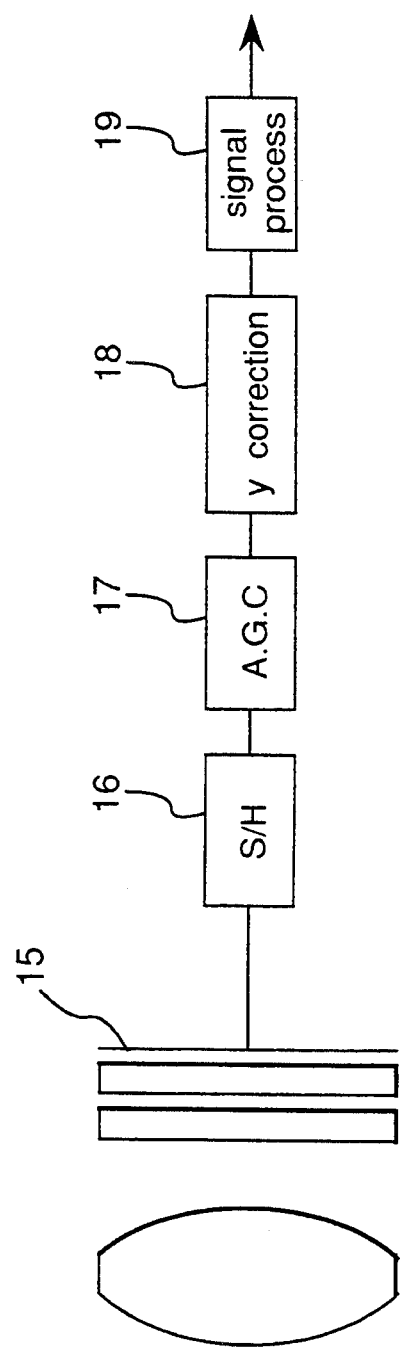

OPTICAL LOW PASS FILTER

BACKGROUND OF THE INVENTION

The present invention generally relates to an optical low pass filter including a phase grating for obtaining useful picture image characteristics by provision preferable low pass effects for each of wavelength region about the spatial frequency components beyond the Nyguist limit which are required to be removed as the picture images are discretely sampled in nature in an optical system of a single tube color television camera having a color separating filter, a color video camera using solid state imaging elements, and so on. The present invention relates to an optical low pass filter which is easier to fabricate.

Generally, in a video camera and so on using solid state imaging elements, the spatial frequency components of the Nyquist limit or more should be removed before images are inputted into the solid imaging elements, because the images of the photographed objects image-formed on the imaging elements include the components beyond the Nyquist limit of the spatial sampling of the solid imaging elements. This is because the picture image signal components beyond the Nyquist limit display the construction not provided originally with respect to the output picture images or become Moire stripes, spurious colors and so on. Therefore, conventionally the higher spatial frequency components in the photographed object to be inputted to the solid state imaging elements are restricted by disposition of the optical low pass filters in one portion of the imaginating system. In recent years, optical low pass filters including phase gratings have been adapted to be used for this purpose.

In recent years, the picture images of a higher resolution have been obtained by the effective use of a fact that the spatial frequency of the green component of the primary color filter used in a single plate type of imaging system is higher than the spatial frequency components of red and blue. As disclosed in, for example, Japanese Laid-Open Patent Publication No. 2-113302, a phase grating optical low pass filter is composed of two layers, with a disadvantage in that it becomes thicker in construction. In the present invention, the construction can be made thinner with the thickness being restricted only to the phase difference generating portion. In the phase grating optical low pass filter in the present invention, an easier coping operation can be effected even with respect to optical line pass adjustment or mechanical adjustment.

SUMMARY OF THE INVENTION

In order to put in practical use a phase grating optical low pass filter having wavelength selectivity, it is necessary to make the grating sufficiently thinner in shape and lighter in weight, considering that recent video cameras have become smaller in size and lighter in weight. Furthermore, in order to have a high quality picture image, the optical low pass filer needs to show superior MTF (Modulation Transfer Function) characteristics at the same time. Also, in order to meet the demands of larger camera market, a method capable of mass production is required. In order to cope with these problems, in the present invention, two materials are arranged side by side in a flat shape, these two materials being equal in refractive index at a certain wavelength in a usable wavelength region and different in refractive index dispersion. The optical low pass effect of the wavelength selectivity can be obtained by the phase difference caused by the refractive index of the two different materials having a wavelength dependence in the projection from the phase grating. Since the base plate portion does not have to be formed of the respective materials, the forming operation can be effected in the thickness of the phase difference generating portion only, so that the present phase grating can be constructed thinner. In the actual insertion thereof into the imaging system, a more compact lens system can be constructed.

In addition, the present invention provides an optical low pass filter comprising at least two types of different optical material members, each having a shape of prism, which are aligned in contact with each other in the direction of the height of prisms being parallel so as to form a single sheet. With such a construction, the filter becomes thin so as to provide a portion for generating a phase difference, and is superior for mass-production as compared to filters formed of a phase lattice on a base plate by means of pressing, cutting and holographic grating. In the filter of the present invention, at least two types of different optical material members are alternately provided contact with each other in parallel prism shapes to generate a refractive index difference between the two adjacent optical materials and a phase difference according to the shape of prism to obtain an effect of a phase lattice. The phase lattice obtained from the filter of the present invention is designed only by a portion for generating a phase difference without providing a base plate for holding a phase difference to make the construction very thin only with the portion of phase difference.

Also, even though, in the case of inserting an optical medium such as a glass on the intermediate way of optical system, it needs a work force to correct the aberration property such as a color aberration of the optical system and it causes some problems such as prolonging the whole length of optical system, the present invention provideds a thin filter which can reduce the design problems, and can form a compact optical system.

In addition, if the combination of at least two types of optical materials for constructing the phase lattice filter of the present invention is selected from a view of the properties of refractive index and refractive index dispersion of the optical materials so that equal refractive indexes at the wavelength are unnecessary, a low pass effect and a generated refractive index difference at the wavelength being necessary for a low pass effect, a filter of the minimum thickness can be constructed for an optical low pass filter of the phase lattice type having a property of wave-selection. For instance, when the phase lattice filter is constructed by forming prisms with two types of materials combined with materials of different refractive index dispersion and equal refractive index in a certain wavelength and aligning the prisms in contact with each other so as to form a single plate, a large low pass effect can be obtained for a phase difference to the great extent in response to the large value of refractive index difference to be disposed between adjacent materials having shapes of prisms for generating the phase difference. On the contrary, the smaller the refractive index difference between adjacent materials is, the smaller the phase difference is, and the low pass effect obtained by the diffraction becomes small. Namely, in the wavelength region near the wavelength λ approximately equal in the refractive index in the above described construction, the low pass effect by the diffraction becomes smaller. In the wavelength region away from the wavelength λ, the refractive index difference of two materials become larger and the pass effect by the diffraction become larger.

Thus, the optical low pass effect becomes weaker near the reference wavelength λ, thus resulting in the MTF characteristics retained higher so far as the region of the high spatial frequency components. Inversely, the optical low pass effect functions large in the wavelength region away from the reference wavelength λ, thus resulting in attenuated MTF characteristics in the comparatively low spatial frequency region. As the phase grating optical low pass filter itself can be constructed in thickness of the phase difference generation portion only in the present construction, the construction can be made thinner. It can be used without the new construction of the special optical system even in the case of the insertion on the way to the lens system.

Preferably, if the cut-off spatial frequency in the wavelength region of the green component of the primary color filter is adapted to become higher, the cut-off frequency in the red or the blue wavelength region is adapted to become lower in accordance with the present invention, an imaging system of higher brilliance resolution degree and less color Moire can be constructed, because the green contributes most towards the brilliance signal.

BRIEF DESCRIPTION OF THE DRAWINGS

These and other objects and features of the present invention will become apparent from the following description taken in conjunction with the preferred embodiment thereof with reference to the accompanying drawings, in which;

FIG. 5 is a diagram showing a video camera imaging system constructed with the use of an optical low pass filter utilizing a wavelength selectivity phase grating in the present embodiment.

DETAILED DESCRIPTION OF THE INVENTION

Figure 1A:
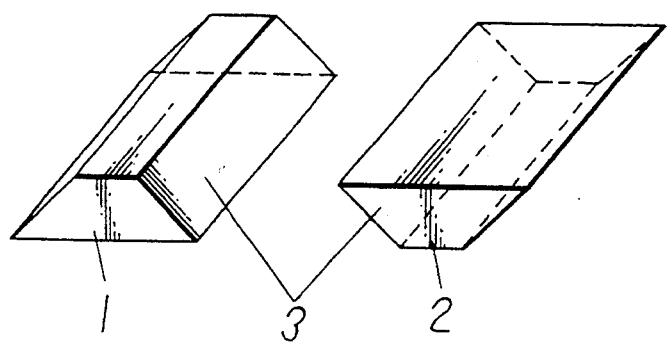
FIG. 1(a) is a perspective view showing a pair of prisms to be employed in an optical low pass filter according to one embodiment of the present invention.

Before the description of the present invention proceeds, it is to be noted that like parts are designated by like reference numerals throughout the accompanying drawings.

An optical low pass filter including a wavelength selectivity phase grating in the present embodiment will be described hereinafter with reference to the drawings.

Figure 1B:
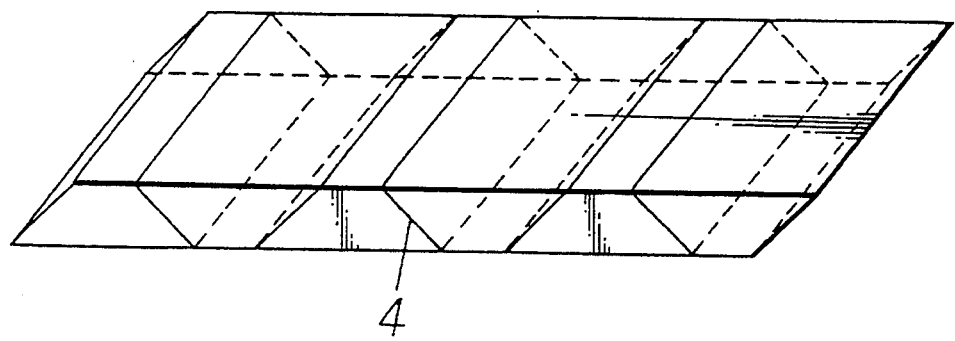
FIG. 1(b) is a basic perspective view of the appearance of an optical low pass filter using a wavelength selectivity phase grating in the embodiment of the present invention.
Figure 2:
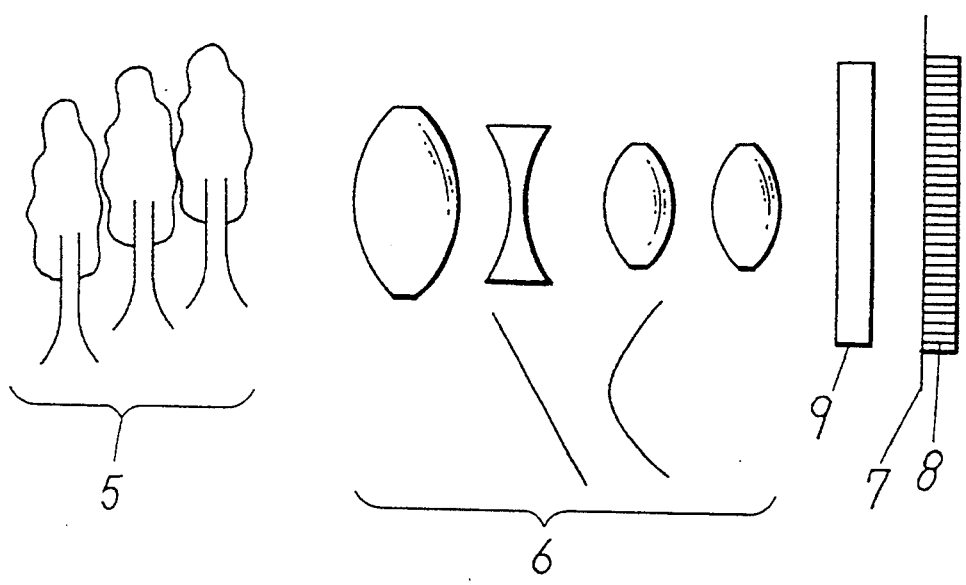
FIG. 2 is an optical principle perspective view when an optical low pass filter using a wavelength selectivity phase grating in the same embodiment.

FIGS. 1(a)-1(b) show a principle construction example of the present invention. In FIGS. 1(a)-(b), a first constructing member 1 of prism shape, i.e., an oblique prism and a second constructing member 2 of prism shape made of a material different from that of the first member 1 are fixed together at the adjacent boundary faces 3 thereof filled with a bonding agent or resin 4. The members of prisms 1 and 2 are aligned on a sheet of plate in contact with each other to form a plane plate. In a principle imaging system using a Front-Cell Focusing zoom lens of an optical low pass filter using the present phase grating, when a photographed object 5, a lens system 6, an image face 7, an imaging element 8 are provided respectively as shown in FIG. 2, a position where an optical low pass filter including a phase grating is desired to be a position where a multiple varying operation is completed in the zoom lens or the like, with an effect that the present invention can be obtained by the arrangement of a phase grating like reference numeral 9. If the optical low pass filter including a selectivity phase grating can be moved by the varying multiplication with the zoom, the position is not necessarily restricted to the position of FIG. 2. The equivalent performance can be obtained if the position is provided between the photographed object 5 and the lens system 6 or in the lens system 6.

Figure 3:
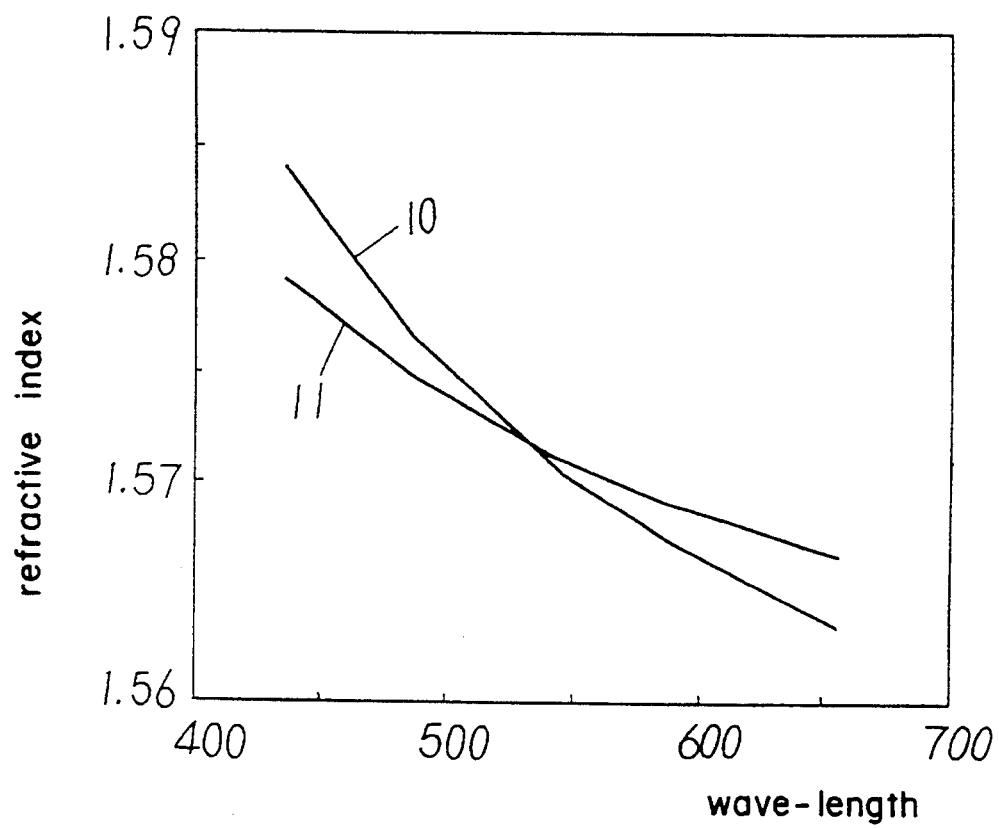
FIG. 3 is a refractive index curve of a material used in the present embodiment.

FIG. 3 shows one example of a combination of materials for realizing the low pass effect about only the blue and red components without having the low pass effect about the green component.

The first member 1 in FIG. 1 is made of an optical glass having refractive index nd of 1.56907 and Abbe's number νd of 71.3, and the second member is made of an optical glass having refractive index nd of 1.56732 and Abbe's number νd of 42.8, the respective refractive index curves of materials 1 and 2 being shown by 10 and 11, wherein the lateral axis is wavelength, while the longitudinal axis is refractive index. As shown by a graph, the members 1 and 2 of different materials have a crossing point whereat the refractive index becomes equal between the waveform ranges of 470 nm to 600 nm of green color, and the refractive index difference becomes larger as moved apart from the wavelength picture having the refractive index being equal. But, the refractive index of optical materials is normally a value listed on a catalogue, and, since it is possible to change the refractive index of materials according to the property of the filter in practical use, it says that it is possible to provide a wavelength, at which the refractive index becomes equal, in the whole range of wavelength of green color.

Figure 4:
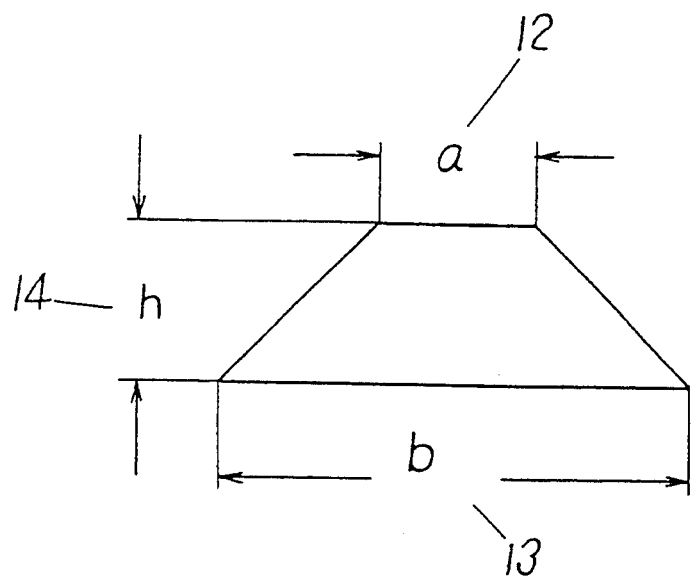
FIG. 4 shows a sectional shape view of a phase difference generating portion in the present embodiment.

FIG. 4 shows a cross section of an optical low pass filter of phase lattice being possible for selecting the wavelength, which is constructed in accordance with the following conditions so that the cut-off frequency becomes 47.5 line pair/mm with the refractive index of materials to be used for splicing being 1.56. The bonding agent is used with a UV resin which is hardened by projecting ultraviolet radiation.

The property of MTF is calculated in algebra on the basis of shape of the materials, and the relationship among the pitch of lattice, interval of filter image planes and wavelength are provided on the consideration of the refractive index being different on the wavelength and the shut-out frequency to be required.

The transferring property of spatial frequency of phase lattice having a shape of oblique prism is given by the following formula, wherein $\Lambda$ is a pitch of lattice, $\phi$ a phase difference, $n1$ (a) and $n2$ (a) a refractive index, $\lambda$ a wavelength, and $h$ a height of phase portion.

$$\mathcal{H}(\xi) = \begin{cases} \frac{\Lambda}{\phi}\sin\frac{4\phi}{\Lambda}\xi + 2\left(\frac{\Lambda}{4} - \xi\right)\cos\frac{4\phi}{\Lambda}\xi + 2\left(\frac{\Lambda}{4} - \xi\right) & 0 \leq \Lambda < \frac{\Lambda}{4} \\ \frac{\Lambda}{\phi}\sin\phi + 2\left(\xi - \frac{\Lambda}{4}\right)\cos\phi + 2\left(\frac{\Lambda}{4} - \xi\right) & \frac{\Lambda}{4} \leq \Lambda < \frac{\Lambda}{2} \end{cases}$$

$$\phi = \frac{2\pi(n1(\lambda) - n2(\lambda))h}{\lambda}$$

For the purpose of obtaining a cut-out frequency by means of space frequency being equal with the center wavelength of R component and the center wavelength of B component according to the property of transferring the space frequency, it is necessary to decide a value of d so as to be equal the property at the point of the cut-off frequency in such a manner that the values of the two center wavelengths are respectively inserted, the space frequency is cut-off, and the properties in the cases of R component and B component are respectively calculated. But, the trigonometric function is done by the liner approximation expression, whereby the following equations can be obtained:

$$\left(\frac{NR}{NB}\right)^2 = \begin{cases} \dfrac{\frac{4df}{\Lambda}\lambda B - 1}{\frac{4df}{\Lambda}\lambda R - 1} & 0 \leq \Lambda < \frac{\Lambda}{4} \\ \dfrac{\frac{\Lambda}{4\lambda B^2} - \frac{df}{\lambda B}}{\frac{\Lambda}{4\lambda R^2} - \frac{df}{\lambda R}} & \frac{\Lambda}{4} \leq \Lambda < \frac{\Lambda}{2} \end{cases}$$

$$NR = n1(\lambda R) - n2(\lambda R)$$
$$NB = n1(\lambda B) - n2(\lambda B)$$

The above equations state the relationship in connection with only the center wavelength of R wavelength range and center wavelength of B wavelength range, having a certain width with respect to the R wavelength range and B wavelength range, and, if the minimum and maximum of the wavelength are respectively considered, the widths of R versus B exist at the extent of the ration from 1 versus 2 to 2 versus 1, whereby the range of (NR/NB)2 is expressed by the following inequality, $$\left(\frac{1}{2} \leq \frac{\lambda B}{\lambda R} \leq 1\right)$$

$$\frac{1 - 4f\lambda B \frac{d}{\Lambda}}{\frac{1}{2} - 4f\lambda R \frac{d}{\Lambda}} < \left(\frac{NR}{NB}\right)^2 < \frac{\frac{1}{2} - 4f\lambda B \frac{d}{\Lambda}}{1 - 4f\lambda R \frac{d}{\Lambda}}$$

wherein the length of the upper bottom portion 12 of the respective trapezoidal shape is 250 μm, the length of the lower bottom portion 13 is 750 μm, the height 14 is 97 μm.

FIG. 5 shows the construction which is adapted to take in the picture image signals of a video camera composed of optical low pass filters using wavelength selectivity phase gratings in an embodiment shown in FIG. 4. In the present construction, the inputting signals from the imaging elements 15 are outputted in picture image through the steps of a sample hold 16, an automatic gain control 17, a τ correction 18, a signal processing 19 and so on. The respective processing steps can be constructed even in a different order. As the phase rating in the present embodiment has no low pass effect in the green zone, a low pass filter of having a low pass effect combined with the Nyquist frequency of the sampling of the green region must be added. As a phase grating is adapted not to cause effects in the vertical direction in the video camera system shown in FIG. 5, the low pass filter about the vertical direction is also required to be added. The low pass filter to be added may become a crystal filter or a phase grating filter.

The optical low pass filter including a wavelength selectivity phase grating and the optical low pass filter for obtaining the low pass effect in the green region are not always required to be joined. The phase grating filter of the wavelength selectivity may be in order provided in either the object side or the image face side. The resolution in the vertical direction can be raised by the use of the optical low pass filter including the phase grating of the present invention with respect to the vertical direction, and can be constructed to have the effect with respect to the two-dimensional direction. A video camera optical system having effects in both the horizontal direction and vertical direction can be constructed by the insertion of one wavelength selectivity phase grating optical low pass filter through the proper rotation of the phase grating filter of the present invention with respect to the optical axis direction.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An optical low pass filter comprising;
   at least two types of different material members, each having a shape of prism, arranged in a row parallel to an imaginary plane which is vertical with respect to an optical axis in an optical system so as to contact the side plane of prism in order with each other;
   each of the prisms having the same height of the size of filter with a cross section matching with a certain thickness of the filter so as not to generate a concave and convex on the both planes of the object side and image plane side in the case of arrangement in a row with the other, and both planes of each prisms at the sides of object and image being disposed in parallel to said imaginary plane.

2. The optical low pass filter as defined in claim 1, wherein two adjacent two prisms are made of different materials, respectively, which are selected as optical materials being equal in the refractive indexes but different in the refractive index dispersions in a certain wavelength of usable wavelength range so as to obtain the optical low pass effect selectively in the wavelength.

3. The optical low pass filter as defined in claim 2, wherein the following conditions are satisfied:

(1) when the refractive indexes in a wavelength $\lambda$ of the two types materials are respectively N1 ($\lambda$) and N2 ($\lambda$) in a certain wavelength $\lambda$ of 470 nm$<\lambda<$600 nm in the range of the wavelength $\lambda$, the refractive indexes of two types materials are expressed by the following formula:

$N1(\lambda)=N2(\lambda)$, (2) when Abbe's number of the two types materials are respectively $\nu d1$ and $\nu d2$, the Abbe's number of two types materials are expressed by the following inequality:

$|\nu d1 - \nu d2| > 20$.

4. The optical low pass filter as defined in claim 2, wherein, which is trapezoidal in sectional shape vertical in the longitudinal direction of one rod shaper or fibrous shaped material, the following conditions are satisfied:

$$\frac{1 - 4f\lambda B \frac{d}{\Lambda}}{\frac{1}{2} - 4f\lambda R \frac{d}{\Lambda}} < \left(\frac{N_R}{N_B}\right)^2 < \frac{2 - 4f\lambda B \frac{d}{\Lambda}}{1 - 4f\lambda R \frac{d}{\Lambda}}$$

wherein the pitch is $\Lambda$, the distance between the phase grating filter and the image face is d, the cut-off frequency is f, $\lambda R$ is the central wavelength of the red component wavelength region of the primary color filer, is $\lambda B$ is the central wavelength of the blue component wavelength region of the primary color filter, NR is the refractive index difference of the layer on the photographed object side and the layer on the image face side in the wavelength $\lambda R$, and NB is the refractive index difference between the layer on the photographed object side and the layer on the image face side in the wavelength $\lambda B$.

5. The optical low pass filter as defined in claim 1, wherein said two types of different material members are joined together by a bonding agent.

6. The optical low pass filter as defined in claim 1, wherein said two types of different material members are joined together by a resin.

7. The optical low pass filter as defined in claim 1, wherein said two types of different material members are joined together while disposed upon a plane surface.

8. The optical low pass filter as defined in claim 4, wherein a video camera is composed using the optical low pass filter.

* * * * *